(12) United States Patent
Sugimoto et al.

(10) Patent No.: US 10,553,838 B2
(45) Date of Patent: Feb. 4, 2020

(54) CYLINDRICAL BATTERY AND METHOD FOR PRODUCING THE SAME

(71) Applicant: Sanyo Electric Co., Ltd., Daito-shi, Osaka (JP)

(72) Inventors: Shuji Sugimoto, Hyogo (JP); Kyosuke Miyata, Osaka (JP); Oose Okutani, Hyogo (JP); Kazutoshi Kohira, Osaka (JP); Tomohiko Yokoyama, Osaka (JP); Shinya Geshi, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 2 days.

(21) Appl. No.: 15/554,479

(22) PCT Filed: Mar. 10, 2016

(86) PCT No.: PCT/JP2016/001338
§ 371 (c)(1),
(2) Date: Aug. 30, 2017

(87) PCT Pub. No.: WO2016/157748
PCT Pub. Date: Oct. 6, 2016

(65) Prior Publication Data
US 2018/0047949 A1    Feb. 15, 2018

(30) Foreign Application Priority Data

Mar. 27, 2015    (JP) .................. 2015-066233

(51) Int. Cl.
*H01M 2/08*    (2006.01)
*H01M 2/12*    (2006.01)
(Continued)

(52) U.S. Cl.
CPC ............... *H01M 2/08* (2013.01); *H01M 2/12* (2013.01); *H01M 2/345* (2013.01);
(Continued)

(58) Field of Classification Search
CPC .... H01M 2/08; H01M 10/04; H01M 10/0587; H01M 2/12; H01M 2/34; H01M 2200/20;
(Continued)

(56) References Cited

U.S. PATENT DOCUMENTS

2006/0204841 A1\* 9/2006 Satoh .................... H01M 2/263
429/161
2009/0061304 A1\* 3/2009 Muraoka ................. H01M 2/00
429/163

(Continued)

FOREIGN PATENT DOCUMENTS

JP        8-007866    \*    1/1996
JP        8-7866 A         1/1996
(Continued)

OTHER PUBLICATIONS

JP2010287567MT.\*

(Continued)

*Primary Examiner* — Alexander Usyatinsky
(74) *Attorney, Agent, or Firm* — Westerman, Hattori, Daniels & Adrian, LLP (57) ABSTRACT

A cylindrical battery in an aspect of the present invention includes an electrode body formed by winding a positive electrode plate and a negative electrode plate with a separator interposed therebetween; an electrolyte; a bottomed cylindrical outer can; and a sealing body crimped to an opening of the outer can via a gasket. The sealing body includes a valve body having an annular protrusion part, an insulating member disposed on an inner circumference of the protrusion part of the valve body and having a skirt portion, and a metal plate disposed on an inner circumference of the skirt portion of the insulating member and (Continued)

connected to a center portion of the valve body. The metal plate is crimped with the protrusion part of the valve body via the insulating member.

5 Claims, 3 Drawing Sheets

(51) Int. Cl.
    *H01M 2/34*        (2006.01)
    *H01M 10/04*       (2006.01)
    *H01M 10/0587*    (2010.01)

(52) U.S. Cl.
    CPC ... *H01M 10/0422* (2013.01); *H01M 10/0587* (2013.01); *H01M 2200/20* (2013.01)

(58) Field of Classification Search
    CPC ............. H01M 2/345; H01M 10/0422; H01M 2/1229; H01M 2/0408; H01M 2/046; H01M 10/058
    See application file for complete search history.

(56) References Cited

U.S. PATENT DOCUMENTS

| | | | |
|---|---|---|---|
| 2010/0233524 A1* | 9/2010 | Hina | H01M 2/0225 429/164 |
| 2011/0195288 A1* | 8/2011 | Harima | H01M 10/0431 429/94 |
| 2012/0231317 A1* | 9/2012 | Shimizu | H01M 2/105 429/120 |
| 2012/0270080 A1 | 10/2012 | Hermann et al. | |
| 2013/0040173 A1* | 2/2013 | Yokoyama | H01M 2/1061 429/53 |
| 2013/0095356 A1* | 4/2013 | Shimizu | H01M 2/1077 429/88 |
| 2015/0333313 A1 | 11/2015 | Yamato et al. | |

FOREIGN PATENT DOCUMENTS

| | | | |
|---|---|---|---|
| JP | 10-154530 A | | 6/1998 |
| JP | 2010287567 | * | 2/2010 |
| JP | 2010-287567 A | | 12/2010 |
| WO | 2014/097586 A1 | | 6/2014 |

OTHER PUBLICATIONS

International Search Report dated Jun. 7, 2016, issued in counterpart International Application No. PCT/JP2016/001338 (1 page).

* cited by examiner

CYLINDRICAL BATTERY AND METHOD FOR PRODUCING THE SAME

TECHNICAL FIELD

The present invention relates to a cylindrical battery including a sealing body having a current interrupting mechanism and to a method for producing the cylindrical battery.

BACKGROUND ART

Sealed batteries are roughly classified into cylindrical batteries, prismatic batteries, and pouch batteries according to the shape and the material of housings that contain an electrode body which is a power-generating element. In particular, cylindrical batteries are used in a wide range of applications pertaining to, for example, power tools, electric power-assisted bicycles, and electric vehicles. In these applications, cylindrical batteries are used as assembled batteries in which batteries are connected in series or in parallel.

In the related art, sealing bodies in cylindrical batteries include a mechanism for ensuring safety. For example, Patent Literature 1 discloses a sealing body including a current interrupting mechanism and an explosion-proof valve as illustrated in FIG. 8.

Figure 8:
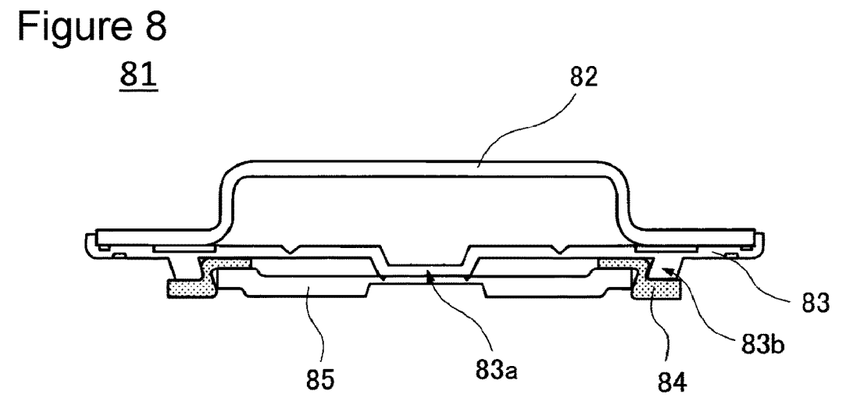
FIG. 8 is a sectional view of a sealing body according to an example of the prior art.

The sealing body 81 illustrated in FIG. 8 is famed by stacking a terminal cap 82, a valve body 83, an insulating member 84, and a metal plate 85 serving as a terminal plate. The valve body 83 has, in its center portion, an annular projection part 83a that projects toward the metal plate 85. The metal plate 85 is connected to the projection part 83a. The insulating member 84 is annularly provided in the vicinity of this connection part so that an outer circumferential portion of the valve body 83 is insulated from an outer circumferential portion of the metal plate 85. Since the valve body 83 receives a battery inner pressure increased by generation of gas inside a battery due to, for example, misuse of the battery, the valve body 83 works so as to pull the connection part in a direction away from the battery. When the battery inner pressure further increases to reach a predetermined value, the connection part fractures to interrupt a current path between the valve body 83 and the metal plate 85. When the battery inner pressure further increases, the valve body 83 fractures so that gas inside the battery is released through a gas port provided in the terminal cap 82.

In the sealing body 81 disclosed in Patent Literature 1, the valve body 83 has a protrusion part 83b that inclines toward the center, and the insulating member 84 has a Z shape in cross section. The insulating member 84 is fitted to the protrusion part 83b, and the metal plate 85 is fitted to the insulating member 84, such that these members are fixed to each other. This structure prevents a fracture of the connection part between the valve body 83 and the metal plate 85 even if the sealing body 81 receives external shock.

CITATION LIST

Patent Literature

PTL 1: International Publication No. WO 2014/097586
PTL 2: Japanese Published Unexamined Patent Application No. 2010-287567

SUMMARY OF INVENTION

Technical Problem

In connecting cylindrical batteries to each other to produce an assembled battery, resistance welding has been commonly employed as a method for connecting respective lead plates to a sealing body serving as a positive electrode terminal and an outer can serving as a negative electrode terminal. As described in Patent Literature 2, wire bonding for attaching an aluminum wire by ultrasonic welding has been recently employed as a method for connecting batteries to provide an assembled battery with a function for interrupting connection between batteries in case of malfunctions of batteries in the assembled battery.

When an aluminum wire is connected to sealing bodies by ultrasonic welding, ultrasonic vibration is applied to sealing bodies through the aluminum wire. Such application of ultrasonic vibration to a sealing body causes vibrations to be transmitted to the inside of the sealing body, which may result in a fracture of the connection part between the valve body and the metal plate and/or misalignment of the metal plate relative to the insulating member.

The sealing body disclosed in Patent Literature 1 is less likely to have the above-described issues because the valve body, the insulating member, and the terminal plate are fixed to each other. However, Patent Literature 1 does not consider the case where ultrasonic vibration is applied to the sealing body.

In light of the above-mentioned circumstances, the present invention is directed to a cylindrical battery having a current interrupting mechanism that is unlikely to fracture even if ultrasonic vibration is applied to a sealing body.

Solution to Problem

To solve the above-mentioned issues, a cylindrical battery according to an aspect of the present invention includes an electrode body famed by winding a positive electrode plate and a negative electrode plate with a separator interposed therebetween, an electrolyte, a bottomed cylindrical outer can, and a sealing body crimped to an opening of the outer can via a gasket.

The sealing body includes a valve body having an annular protrusion part, an insulating member disposed on an inner circumference of the protrusion part of the valve body and having a skirt portion, and a metal plate disposed on an inner circumference of the skirt portion of the insulating member and connected to a center portion of the valve body.

The metal plate is crimped with the protrusion part of the valve body via the insulating member.

The present invention is further directed to a method for producing the cylindrical battery according to an aspect including steps (1) to (4) described below.

Step (1) of preparing a valve body having an annular protrusion part, a metal plate, and an insulating member having a skirt portion.

Step (2) of fitting the metal plate to the inner side of the skirt portion of the insulating member.

Step (3) of fitting the insulating member to the inner side of the protrusion part of the valve body.

Step (4) of pressing the protrusion part of the valve body such that the protrusion part of the valve body secures the metal plate via the insulating member.

Advantageous Effects of Invention

Since three members, which are the valve body, the insulating member, and the metal plate, are fixed to each other to form a current interrupting mechanism according to the present invention, the current interrupting mechanism retains its function even if ultrasonic vibration is applied to the sealing body. The present invention can provide a cylindrical battery having high quality because, for example, the current interrupting mechanism operates properly even if external shock or vibration is applied to the battery.

DESCRIPTION OF EMBODIMENTS

Embodiments of the present invention will be described below by using a non-aqueous electrolyte secondary battery which is an example cylindrical battery. The present invention is not limited to the following embodiments. Changes and modifications can be appropriately carried out without departing from the scope of the present invention.

Figure 1:
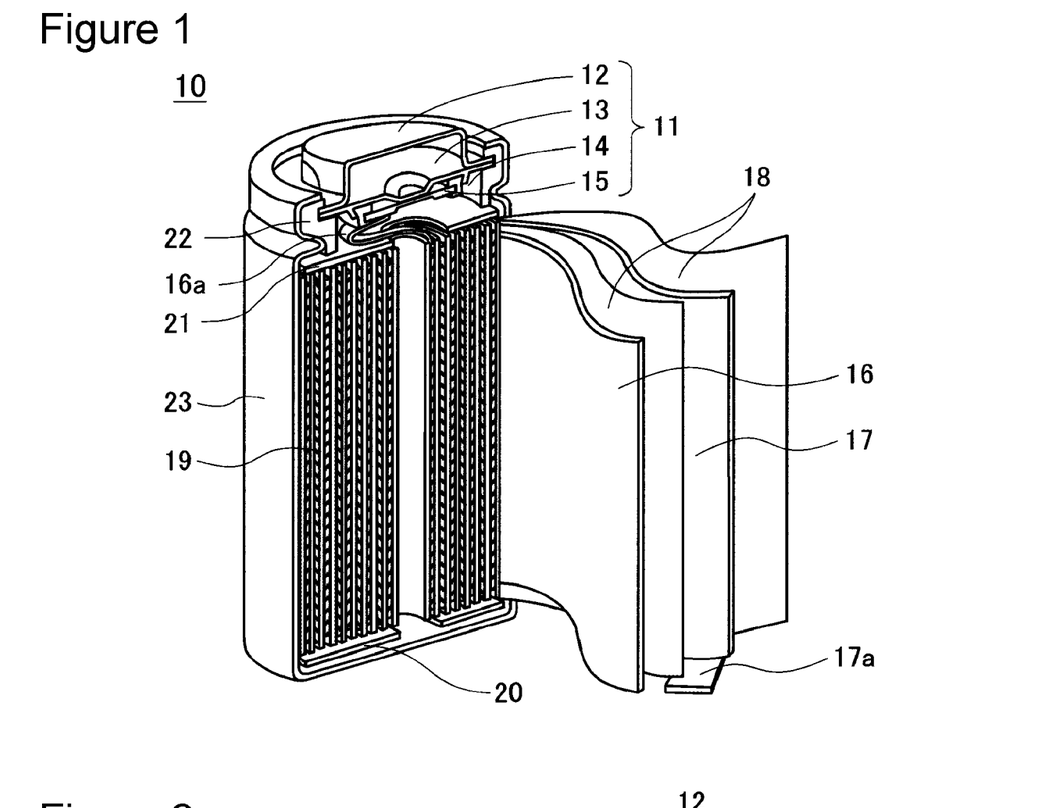
FIG. 1 is a cross-sectional perspective view of a cylindrical non-aqueous electrolyte secondary battery according to an embodiment of the present invention.

A non-aqueous electrolyte secondary battery 10 illustrated in FIG. 1 includes an electrode body 19 and an electrolyte (not shown) in a bottomed cylindrical outer can 23. A sealing body 11 is crimped to an opening of the outer can 23 via a gasket 22. This configuration seals the battery.

Figure 2:
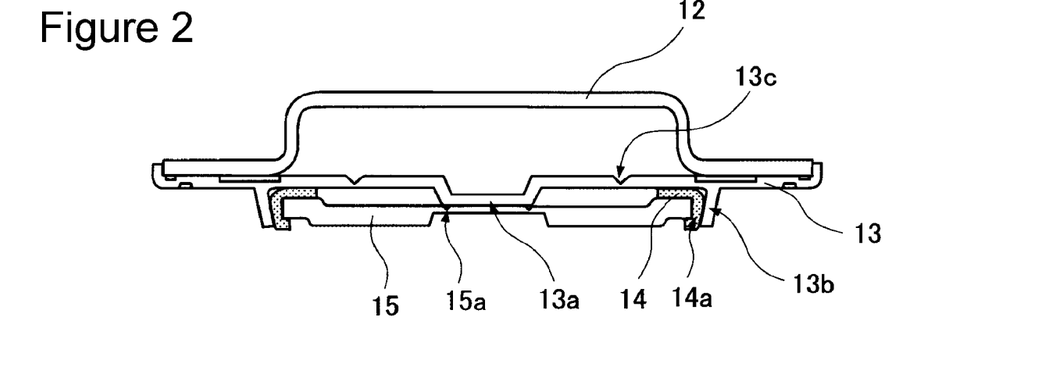
FIG. 2 is a sectional view of a sealing body according to an embodiment of the present invention.

As illustrated in FIG. 2, the sealing body 11 includes a terminal cap 12, a valve body 13, an insulating member 14, and a metal plate 15. The valve body 13 and the metal plate 15 are connected at their center portions. The insulating member 14 is interposed between the outer circumferential portion of the valve body 13 and the outer circumferential portion of the metal plate 15. The terminal cap 12 on the battery outer side of the valve body 13 functions as an external terminal, whereas the metal plate 15 connected to a positive electrode lead 16a extending from the electrode body 19 functions as an inner terminal.

The current interrupting mechanism operates in the following manner. The metal plate 15 has a gas port. When the battery inner pressure increases, the valve body 13 receives an increased battery inner pressure. As the battery inner pressure increases, the valve body 13 works so as to pull the connection part between the valve body 13 and the metal plate 15 in a direction away from the battery. When the battery inner pressure reaches a predetermined value, a thin part 15a located in a part of the metal plate connected to the valve body 13 or in the metal plate 15 fractures to interrupt a current path between the valve body 13 and the metal plate 15. The sealing body 11 including three members, the valve body 13, the insulating member 14, and the metal plate 15, forms a current interrupting mechanism. When the battery inner pressure further increases after operation of the current interrupting mechanism, the valve body 13 fractures with a thin part 13c in the valve body 13 as a starting point so that gas inside the battery is released through a gas port provided in the terminal cap 12.

Figure 3:
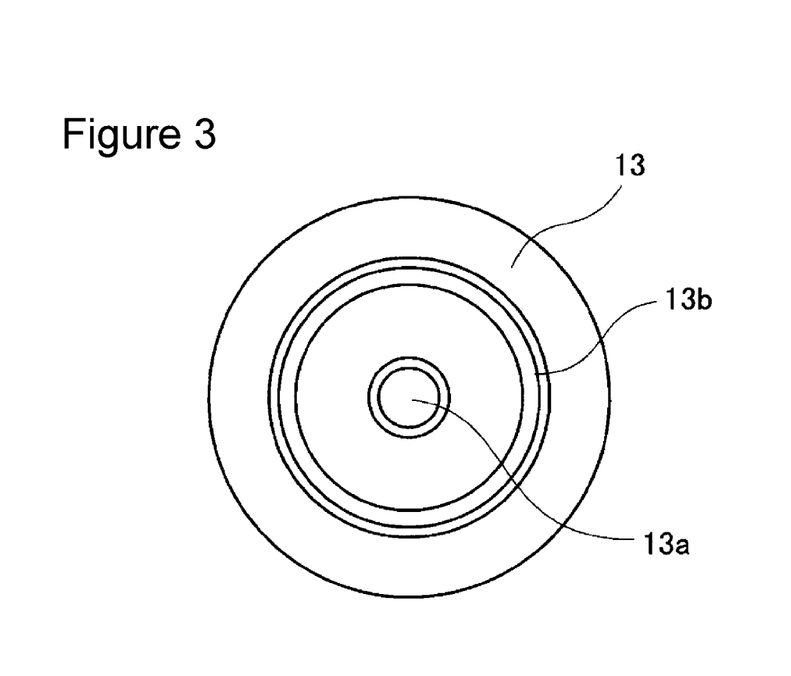
FIG. 3 is a plan view of a valve body according to an embodiment of the present invention as viewed from inside the battery.

The valve body 13 can be produced by performing press processing on a plate material made of aluminum or an aluminum alloy. Since aluminum and aluminum alloys have good flexibility, they are suitable for materials of the valve body 13. The valve body 13 has a protrusion part 13a in the center portion and a protrusion part 13b in the outer circumferential portion on the battery inner side-surface. The protrusion part 13a in the center portion facilitates connection between the valve body 13 and the metal plate 15 and provides a space for interposing the insulating member 14 between the outer circumferential portion of the valve body 13 and the outer circumferential portion of the metal plate 15. As illustrated in FIG. 3, the protrusion part 13b in the outer circumferential portion is formed so as to have an annular shape in plan view. The protrusion part 13b secures the metal plate 15 via the insulating member 14.

Figure 4:
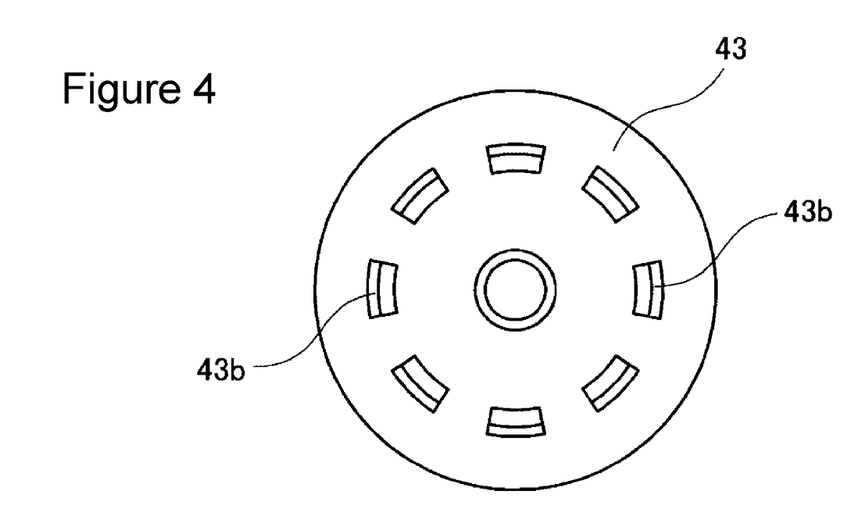
FIG. 4 is a plan view of a modified valve body according to an embodiment of the present invention as viewed from inside the battery.
Figure 5:
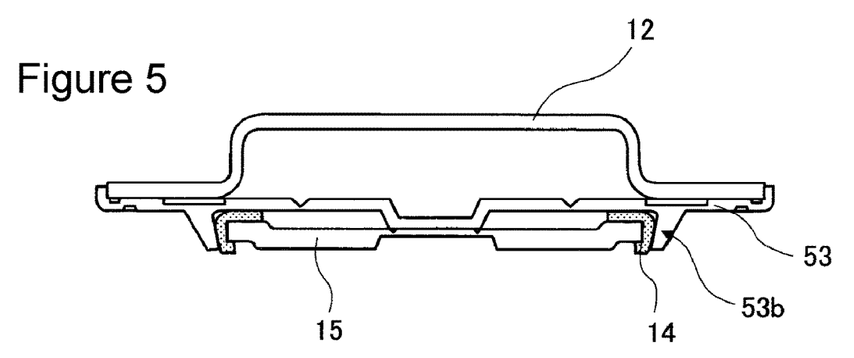
FIG. 5 is a sectional view of a modified sealing body according to an embodiment of the present invention.
Figure 6:
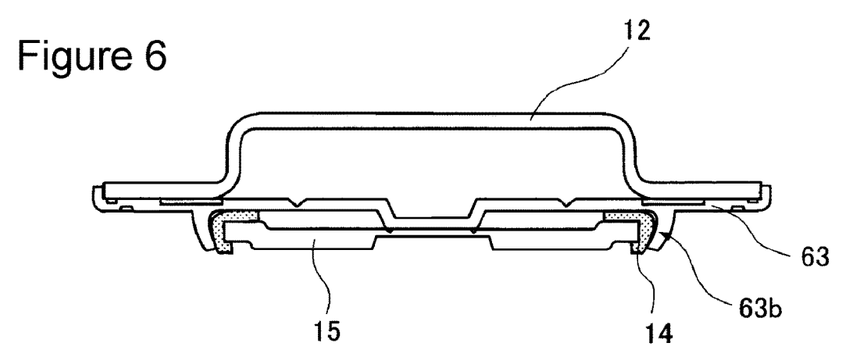
FIG. 6 is a sectional view of a modified sealing body according to an embodiment of the present invention.

In the present invention, the modifications illustrated in FIGS. 4 to 6 can be used instead of having the protrusion part 13b illustrated in FIG. 2 and FIG. 3.

FIG. 4 illustrates a protrusion part 43b in which plural protrusions are arranged into a broken annular shape. Such a protrusion part including plural protrusions makes it easy to press the protrusion part so as to bend the protrusion part toward the center. The size and the number of the protrusions can be freely set as long as the metal plate can be crimped with the protrusion part.

FIG. 5 illustrates a protrusion part 53b that is tapered from the bottom toward the end. Such a tapered cross section of the protrusion part can increase the mechanical strength of the protrusion part.

FIG. 6 illustrates a protrusion part 63b famed to have a curved cross section. Such a curved cross section of the protrusion part allows the end of the protrusion part to locally press the insulating member. The protrusion part having a curved cross section can thus increase a force with which the metal plate is secured. Since the above-described effect is obtained as long as the inner side of the cross section of the protrusion part is curved, the outer side of the cross section of the protrusion part may be linear.

The insulating member 14 ensures electrical insulation and can be made of a material that does not affect battery characteristics. The material used for the insulating member 14 is preferably a polymer resin. Examples of the polymer resin include a polypropylene (PP) resin and a polybutylene terephthalate (PBT) resin.

The insulating member 14 has, on its outer circumference, a skirt portion 14a extending inward in the battery so that the protrusion part 13b of the valve body 13 can secure the metal plate 15 via the insulating member 14. As illustrated in FIG. 2, the metal plate 15 is disposed on the inner circumference of the skirt portion 14a, which allows the metal plate 15 to be secured with the protrusion part 13b of the valve body 13 via the insulating member 14. The cross section of the insulating member 14 may be Z-shaped as a result of bending the end of the skirt portion 14a toward the protrusion part 13b of the valve body 13. However, the end of the skirt portion 14a is preferably bent toward the metal plate 15 in order to avoid misalignment of the metal plate 15 relative to the insulating member 14.

In order that the metal plate 15 be secured with the protrusion part 13b of the valve body 13 via the insulating member 14, the method for producing the sealing body 11 preferably includes the following processes. First, the valve body 13, the insulating member 14, and the metal plate 15 for forming the sealing body 11 are prepared. Next, the metal plate 15 is fitted to the inner side of the skirt portion 14a of the insulating member 14, and the insulating member 14 is fitted to the inner side of the protrusion part 13b of the valve body 13. The protrusion part 13b is then pressed toward the center such that the protrusion part 13b of the valve body 13 secures the metal plate 15 via the insulating member 14. The order of these two processes for fitting the above-described members may be changed.

The valve body 13 and the metal plate 15 are preferably connected to each other after completion of the above-mentioned processes. Since the valve body 13 and the metal plate 15 can be connected to each other with these members fixed to each other, there is a small variation in connection strength. The metal plate 15 is preferably made of aluminum or an aluminum alloy like the valve body 13. This configuration facilitates connection between the valve body 13 and the metal plate 15. The valve body 13 and the metal plate 15 are preferably connected by laser welding.

Figure 7:
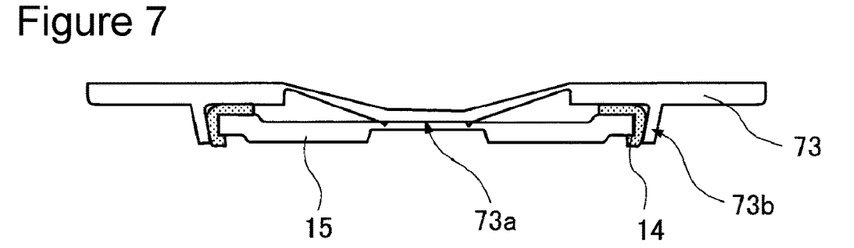
FIG. 7 is a sectional view of a modified sealing body according to an embodiment of the present invention.

The sealing body having the terminal cap 12 is described as an embodiment of the present invention. However, the terminal cap 12 can be omitted as shown in FIG. 7 because the current interrupting mechanism can be famed by the valve body, the insulating member, and the metal plate. The use of the valve body 73 as an external terminal in this way can sufficiently ensure the path through with gas inside the battery is released when the valve body 73 fractures due to an increased battery inner pressure.

Next, the electrode body 19 will be described. In this embodiment, the electrode body 19 formed by winding a positive electrode plate 16 and a negative electrode plate 17 with a separator 18 interposed therebetween as illustrated in FIG. 1 is used.

The positive electrode plate 16 can be produced, for example, in the following manner. First, a positive electrode mixture slurry is prepared by uniformly kneading a positive electrode active material and a binder in a dispersion medium. The binder is preferably polyvinylidene difluoride and the dispersion medium is preferably N-methylpyrrolidone. A conducting agent, such as graphite or carbon black, is preferably added to the positive electrode mixture slurry. This positive electrode mixture slurry is applied onto a positive electrode current collector and dried to form a positive electrode mixture layer. At this time, a positive electrode current collector-exposed portion without the positive electrode mixture layer is formed on part of the positive electrode current collector. Next, the positive electrode mixture layer is compressed to a predetermined thickness with a roller, and the electrode plate after compression is cut in a predetermined size. Finally, the positive electrode lead 16a is connected to the positive electrode current collector-exposed portion to obtain the positive electrode plate 16.

As a positive electrode active material, any lithium-transition metal composite oxide that can intercalate and deintercalate lithium ions can be used. Examples of lithium-transition metal composite oxides include general formula $LiMO_2$ (M represents at least one of Co, Ni, and Mn), $LiMn_2O_4$, and $LiFePO_4$. These lithium-transition metal composite oxides may be used alone or as a mixture of two or more. These lithium-transition metal composite oxides may be used with the addition of at least one selected from the group consisting of Al, Ti, Mg, and Zr or the substitution with a transition metal element.

The negative electrode plate 17 can be produced, for example, in the following manner. First, a negative electrode mixture slurry is prepared by uniformly kneading a negative electrode active material and a binder in a dispersion medium. The binder is preferably a styrene-butadiene (SBR) copolymer, and the dispersion medium is preferably water. A thickener, such as carboxymethyl cellulose, is preferably added to the negative electrode mixture slurry. This negative electrode mixture slurry is applied onto a negative electrode current collector and dried to form a negative electrode mixture layer. In this process, a negative electrode current collector-exposed portion without the negative electrode mixture layer is famed on part of the negative electrode current collector. Next, the negative electrode mixture layer is compressed to a predetermined thickness with a roller, and the electrode plate after compression is cut in a predetermined size. Finally, a negative electrode lead 17a is connected to the negative electrode current collector-exposed portion to obtain the positive electrode plate 17.

As the negative electrode active material, a carbon material or metal material that can intercalate and deintercalate lithium ions can be used. Examples of carbon materials include graphite, such as natural graphite and artificial graphite. Examples of metal materials include silicon, tin, and oxides thereof. These carbon materials or metal materials may be used alone or as a mixture of two or more.

As a separator 18, a microporous membrane containing, as a main component, a polyolefin, such as polyethylene (PE) or polypropylene (PP), can be used. A single layer of microporous membrane may be used or two or more layers of microporous membranes may be used. A multilayer separator composed of two or more layers preferably includes an intermediate layer famed of a layer mainly composed of polyethylene (PE) having a low melting point and a surface layer composed of polypropylene (PP) having high oxidation resistance. Furthermore, inorganic particles made of, for example, aluminum oxide ($Al_2O_3$), titanium oxide ($TiO_2$), or silicon oxide ($SiO_2$) may be added to the separator 18. These inorganic particles may be contained in the separator or may be applied to the surface of the separator together with a binder.

A non-aqueous electrolyte containing a lithium salt, or an electrolyte salt, dissolved in a non-aqueous solvent can be used.

Examples of the non-aqueous solvent include cyclic carbonates, chain carbonates, cyclic carboxylates, and chain carboxylates. These non-aqueous solvents are preferably used as a mixture of two or more. Examples of cyclic carbonates include ethylene carbonate (EC), propylene carbonate (PC), and butylene carbonate (BC). Cyclic carbonates, such as fluoroethylene carbonate (FEC), in which some of hydrogen atoms are substituted with fluorine atoms can also be used. Examples of chain carbonates include dimethyl carbonate (DMC), ethyl methyl carbonate (EMC), diethyl carbonate (DEC), and methyl propyl carbonate (MPC). Examples of cyclic carboxylates include γ-butyrolactone (γ-BL) and γ-valerolactone (γ-VL). Examples of chain carboxylates include methyl pivalate, ethyl pivalate, methyl isobutyrate, and methyl propionate.

Examples of lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}CL_{12}$. Among these lithium salts, $LiPF_6$ is particularly preferred, and the concentration of $LiPF_6$ in the non-aqueous electrolyte is preferably 0.5 to 2.0 mol/L. $LiPF_6$ may be mixed with another lithium salt, such as $LiBF_4$.

EXAMPLES

Embodiments of the present invention will be described below in detail on the basis of Examples of the cylindrical non-aqueous electrolyte secondary battery.

Example 1

(Production of Sealing Body)

A sealing body 11 illustrated in FIG. 2 was produced in the following manner. A terminal cap 12, a valve body 13, and a metal plate 15 were each formed into a predetermined shape by performing press processing on a plate material made of metal. The terminal cap 12 was made of iron, and the valve body 13 and the metal plate 15 were made of aluminum. The insulating member 14 was produced by punching a plate material made of polypropylene, a thermoplastic resin, in an annular shape and thermoforming the punched plate material so as to have the cross section illustrated in FIG. 2.

The valve body 13 was provided with a protrusion part 13a and a protrusion part 13b in its center portion and its outer circumferential portion, respectively. In this stage, the protrusion part 13b protrudes in a direction perpendicular to the plane of the valve body 13. The protrusion part 13b is formed of one annular protrusion as illustrated in FIG. 3. A groove-shaped thin part 13c was formed in the vicinity of the protrusion part 13a. This thin part 13c serves as a fracture starting point when the battery inner pressure increases and the valve body 13 functions as a safety valve.

A thin region was formed in a center portion of the metal plate 15. A thin part 15a having an annular shape in plan view and a V shape in cross section was famed in this thin region. This thin part 15a functions as a current interrupting part, and the thickness of the thin part 15a was controlled so as to obtain a working pressure of 2.5 MPa. The metal plate 15 was provided with a gas port.

The metal plate 15 produced as described above was fitted to the inner circumference of the skirt portion 14a of the insulating member 14 such that the insulating member 14 held the metal plate 15. Next, the insulating member 14 holding the metal plate 15 was fitted to the inner circumference of the protrusion part 13b of the valve body 13. The protrusion part 13b was pressed radially inward so that the metal plate 15 was crimped with the protrusion part 13b. After crimping, the protrusion part 13a of the valve body 13 was connected to the metal plate 15 by laser welding. Finally, the terminal cap 12 was connected onto the valve body 13 to produce the sealing body 11.

(Production of Positive Electrode Plate)

The following materials were mixed: 95 parts by mass lithium-cobalt composite oxide ($LiCoO_2$), which was a positive electrode active material; 2.5 parts by mass polyvinylidene difluoride (PVdF), which was a binder; and 2.5 parts by mass acetylene black, which was a conducting agent. This mixture was placed in N-methyl-2-pyrrolidone (NMP) serving as a dispersion medium, and the dispersion was kneaded to prepare a positive electrode mixture slurry. This positive electrode mixture slurry was applied to both sides of a positive electrode current collector made of aluminum foil and dried to form a positive electrode mixture layer. In this process, a positive electrode current collector-exposed portion without the positive electrode mixture layer was formed on part of the positive electrode current collector. Next, the positive electrode mixture layer was compressed to a predetermined thickness with a roller, and the electrode plate after compression was cut in a predetermined size. Finally, a positive electrode lead 16a made of aluminum was connected to the positive electrode current collector-exposed portion to produce a positive electrode plate 16.

(Production of Negative Electrode Plate)

The following materials were mixed: 95 parts by mass graphite, which was a negative electrode active material; 3 parts by mass styrene-butadiene rubber (SBR), which was a binder; and 2 parts by mass carboxymethyl cellulose (CMC), which was a thickener. This mixture was placed in water serving as a dispersion medium, and the dispersion was kneaded to prepare a negative electrode mixture slurry. This negative electrode mixture slurry was applied to both sides of a negative electrode current collector made of copper foil and dried to form a negative electrode mixture layer. In this process, a negative electrode current collector-exposed portion without the negative electrode mixture layer was formed on part of the negative electrode current collector. Next, the negative electrode mixture layer was compressed to a predetermined thickness with a roller, and the electrode plate after compression was cut in a predetermined size. Finally, a negative electrode lead 17a made of nickel was connected to the negative electrode current collector-exposed portion to produce a negative electrode plate 17.

(Production of Electrode Body)

An electrode body 19 was produced by winding a positive electrode plate 16 and a negative electrode plate 17 with a separator 18 interposed therebetween. The separator 18 was famed of a microporous polyolefin membrane.

(Production of Non-Aqueous Electrolyte)

A non-aqueous solvent was prepared by mixing ethylene carbonate (EC), dimethyl carbonate (DMC), and ethyl methyl carbonate (EMC). In this non-aqueous solvent, 1 mol/L of lithium hexafluorophosphate ($LiPF_6$), an electrolyte salt, was dissolved to produce a non-aqueous electrolyte.

(Assembly of Non-Aqueous Electrolyte Secondary Battery)

As illustrated in FIG. 1, a lower insulating plate 20 was disposed at the bottom of the electrode body 19, and the electrode body 19 was placed in a bottomed cylindrical outer can 23. The negative electrode lead 17a was connected to the bottom of the outer can 23 by resistance welding. Next, an upper insulating plate 21 was disposed at the top of the electrode body 19, and a U-shaped groove 1.0 mm wide and 1.5 mm deep was circumferentially famed on the outer can 23 near the opening by plastic working. The positive electrode lead 16a was then connected to the metal plate 15, and the sealing body 11 was crimped to the groove formed on the outer can 23 via a gasket 22 to produce a non-aqueous electrolyte secondary battery 10.

Example 2

A non-aqueous electrolyte secondary battery according to Example 2 was produced in the same manner as in Example 1 except that a valve body 43 having a protrusion part 43b in which plural protrusions were arranged into a broken annular shape as illustrated in FIG. 4 was used.

Example 3

A non-aqueous electrolyte secondary battery according to Example 3 was produced in the same manner as in Example 1 except that a valve body 53 having a protrusion part 53b having a tapered cross section as illustrated in FIG. 5 was used.

Example 4

A non-aqueous electrolyte secondary battery according to Example 4 was produced in the same manner as in Example 1 except that a valve body 63 having a protrusion part 63b having a curved cross section as illustrated in FIG. 6 was used.

Example 5

As illustrated in FIG. 7, a sealing body including a valve body 73, an insulating member 14, and a metal plate 15 was produced in the following manner. Since this sealing body does not have a terminal cap, the valve body 73 functions as an external terminal. The valve body 73 was provided with a protrusion part 73a and a protrusion part 73b in its center portion and its outer circumferential portion, respectively. The valve body 73 was provided with a thin part around the protrusion part 73a such that the valve body 73 was able to be defamed by receiving the battery inner pressure. A thick part that functioned as an external terminal was provided around the thin part. The protrusion part 73b had the same shape as the protrusion part 13b according to Example 1. A non-aqueous electrolyte secondary battery in Example 5 was produced in the same manner as in Example 1 except that the sealing body thus produced was used.

Comparative Example

As illustrated in FIG. 8, a sealing body 81 including a terminal cap 82, a valve body 83, an insulating member 84, and a metal plate 85 was produced in the following manner. The terminal cap 82 and the metal plate 85 were produced by a method similar to that in Example 1. The valve body 83 was produced by performing press processing on a plate material made of aluminum. A protrusion part 83b was made to incline toward the center during production of the valve body 83. The insulating member 84 was produced by punching a plate material made of a polypropylene resin in an annular shape and thermoforming the punched plate material so as to have a Z shape in cross section. A metal plate 15 was then fitted to the inner side of an insulating member 14, and the insulating member 14 was fitted to the inner side of the protrusion part 83b of the valve body 83. Finally, the protrusion part 83a in the center portion of the valve body was connected to the metal plate 85, and the terminal cap 82 was connected onto the valve body 83 to produce the sealing body 81. A non-aqueous electrolyte secondary battery according to Comparative Example was produced in the same manner as in Example 1 except that the sealing body 81 was used.

(Ultrasonic Vibration Test)

Ultrasonic vibration was applied to the sealing bodies of batteries according to Examples 1 to 5 and Comparative Example. Application of ultrasonic vibration to each sealing body was carried out while welding pressure was applied to an aluminum lead on the sealing body with a horn. In order to clarify an individual difference in the effect of ultrasonic waves, the vibration time was set to longer than the time required for welding the aluminum lead. After application of ultrasonic vibration, whether the connection part between the valve body and the metal plate inside the sealing body fractured was determined. Five batteries were used for each of Examples and Comparative Example in this test.

The results are shown in Table 1.

TABLE 1

| | number of batteries in which connection part between valve body and metal plate fractured |
|---|---|
| Example 1 | 0/5 |
| Example 2 | 0/5 |
| Example 3 | 0/5 |
| Example 4 | 0/5 |
| Example 5 | 0/5 |
| Comparative Example | 1/5 |

Table 1 shows that the resistance to ultrasonic vibration in Examples 1 to 5 is higher than that in Comparative Example. In Comparative Example, the insulating member is fitted to the valve body, and the metal plate is fitted to the insulating member. In the sealing body of Comparative Example, the valve body, the insulating member, and the metal plate are also fixed to each other to a certain degree in this way. Testing with normal ultrasonic welding is unlikely to reveal an issue of a fracture of the connection part. However, testing with a longer ultrasonic vibration time reveals superiority of the present invention. The results described above indicate that the resistance of the cylindrical battery to external vibration or shock can also be improved according to the present invention.

A detailed examination on each sealing body after testing suggests that there is no misalignment of the metal plate relative the insulating member in Examples 1 to 5. In some sealing bodies in Comparative Example, there is misalignment of the metal plate relative to the insulating member. The reason why no misalignment occurs in Examples 1 to 5 is that the protrusion part of the valve body secures the metal plate via the insulating member. Another reason is that the end of the skirt portion is bent radially inward and thus the insulating member can hold the metal plate as if the insulating member wraps the metal plate.

INDUSTRIAL APPLICABILITY

As described above, the present invention can provide a cylindrical battery having a sealing body that retains its function even if external vibration such ultrasonic vibration is applied to the sealing body. Therefore, the present invention can greatly contribute to an improvement in the quality of the cylindrical battery. Since cylindrical batteries can be connected to each other by wire bonding according to the present invention, the present invention can improve the degree of freedom in design of assembled batteries.

REFERENCE SIGNS LIST

10 Non-aqueous electrolyte secondary battery
11 Sealing body
12 Terminal cap
13 Valve body
13b Protrusion part
13c Thin part
14 Insulating member
14a Skirt portion
15 Metal plate
15a Thin part
16 Positive electrode plate
17 Negative electrode plate
18 Separator
19 Electrode body
23 Outer can

The invention claimed is:

1. A cylindrical battery comprising: an electrode body formed by winding a positive electrode plate and a negative electrode plate with a separator interposed there between; an electrolyte; a bottomed cylindrical outer can; and a sealing body crimped to an opening of the outer can via a gasket, wherein
   the sealing body includes a valve body having an annular protrusion part, an insulating member disposed on an inner circumference of the protrusion part of the valve body and having a skirt portion, and a metal plate disposed on an inner circumference of the skirt portion of the insulating member and connected to a center portion of the valve body,
   the metal plate is crimped with the protrusion part of the valve body via the insulating member, and
   the protrusion part of the valve body is circumferentially inward from a portion of the valve body which faces the gasket.

2. The cylindrical battery according to claim 1, wherein an end of the skirt portion is bent radially inward along a surface of the metal plate.

3. The cylindrical battery according to claim 1, wherein the protrusion part is tapered.

4. The cylindrical battery according to claim 1, wherein the protrusion part is formed of one annular protrusion or a plurality of protrusions arranged into a broken annular shape.

5. A method for producing a cylindrical battery in which a sealing body is crimped to an opening of a bottomed cylindrical outer can housing an electrolyte and an electrode body, the method comprising:
   a step of preparing a valve body having an annular protrusion part, a metal plate, and an insulating member having a skirt portion;
   a step of fitting the metal plate to an inner side of the skirt portion of the insulating member;
   a step of fitting the insulating member to an inner side of the protrusion part of the valve body;
   a step of pressing the protrusion part of the valve body toward a center such that the protrusion part of the valve body secures the metal plate via the insulating member, and
   crimping the sealing body to the opening of the outer can at a position circumferentially outward and apart from the protrusion part.

\* \* \* \* \*